United States Patent [19]

Murakami et al.

[11] Patent Number: 4,823,753
[45] Date of Patent: Apr. 25, 1989

[54] IGNITION TIMING CONTROLLER FOR ENGINE

[75] Inventors: Nobuaki Murakami; Yasuyuki Hatsuda, both of Kyoto, Japan

[73] Assignee: Mitsubishi Jidosha Kogyo Kabushiki Kaisha, Tokyo, Japan

[21] Appl. No.: 113,735

[22] Filed: Oct. 28, 1987

[30] Foreign Application Priority Data

Oct. 31, 1986 [JP] Japan .................. 61-260528

[51] Int. Cl.⁴ ................ F02M 35/10; F02P 5/15
[52] U.S. Cl. .................... 123/417; 123/188 M; 123/306
[58] Field of Search .......... 123/306, 308, 417, 188 M, 123/416

[56] References Cited

U.S. PATENT DOCUMENTS

| 4,494,508 | 1/1985 | Ma ........................ 123/306 |
| 4,523,559 | 6/1985 | Latsch ................... 123/306 |
| 4,532,902 | 8/1985 | Mizuno .................. 123/308 |
| 4,592,315 | 6/1986 | Kobayashi ............. 123/308 |
| 4,704,996 | 11/1987 | Morikawa ............. 123/306 |

FOREIGN PATENT DOCUMENTS

| 0071272 | 2/1983 | European Pat. Off. . |
| 0164558 | 12/1985 | European Pat. Off. . |
| 0163952 | 12/1985 | European Pat. Off. . |
| 0163955 | 12/1985 | European Pat. Off. . |
| 3515043 | 11/1985 | Fed. Rep. of Germany . |

Primary Examiner—Willis R. Wolfe

[57] ABSTRACT

Disclosed herein is an ignition timing controller for a sparing engine. The controller is equipped with a variable swirl forming device for changing over the state of swirling of air, which is flowing into an intake port, in accordance with the operation zone of the engine, so that an optimal control of ignition timing is assured even at the time of malfunction of the variable swirl forming device or during a transition period such as a delay in response by the variable swirl device. The controller is hence equipped additionally with an ignition timing setting device for receiving information on the operation zone of the engine and setting ignition timing information corresponding to the state of swirling on the basis of the information on the operation zone, a swirl detection device for detecting the actual state of operation of the variable swirl forming device, and a swirl ignition timing correction device for permitting further correction of the ignition timing information from ignition timing setting device on the basis of a detection signal from the swirl detecting device.

16 Claims, 15 Drawing Sheets

A—A CROSS-SECTION

B—B CROSS-SECTION

C—C CROSS-SECTION

J—D CROSS-SECTION

K—E CROSS-SECTION

L—F CROSS-SECTION

M—G CROSS-SECTION

N—H CROSS-SECTION

O—I CROSS-SECTION

IGNITION TIMING CONTROLLER FOR ENGINE

BACKGROUND OF THE INVENTION (1) Field of the Invention

This invention relates to an ignition timing controller e.g. gasoline engine (sparking engine), which is equipped with a variable swirl forming means for changing over the swirling state of an air stream, which is flowing into an intake port, in accordance with the operation zone.

(2) Description of the Prior Art

An ignition timing controller for a gasoline engine (sparking engine) has heretofore been composed a crank angle sensor for detecting the crank angle of the engine, a standard ignition timing determining means for receiving a detection signal from the crank angle sensor and determining the standard ignition timing of the engine (this standard ignition timing is set at 0° when a specific cylinder is in a specific phase) and at least one spark plug provided with each cylinder of the engine as an ignition means for inducing an ignition in the combustion chamber of the cylinder responsive to a standard ignition timing signal from the standard ignition timing determining means as well as an ignition timing correction means for either retarding or advancing the standard ignition timing in accordance with the coolant temperature, the intake air temperature and the degree of knocking.

On the other hand, a variety of variable swirl forming devices have also been proposed to form swirls selectively in an air stream, which is flowing into a combustion chamber from an intake port, depending on the state of an engine, for example, the state of its rotation.

It has also been proposed that the above-mentioned ignition timing correction means has an ignition advancing map for a lean burn feedback control (hereinafter called "L-FB ignition advancing map") and another ignition advancing map for a control other than the lean burn feedback control (hereinafter called "non-L-FB ignition advancing map") in order to control the air/fuel ratio depending whether the variable swirl forming device is actuated or not.

With such an ignition timing correction means, it is practised to set the L-FB ignition advancing map at a required advancing value corresponding to an operated state of the variable swirl forming device (occurrence of swirling) and the non-L-FB ignition advancing map at another required advancing value corresponding to the non-operated state of the variable swirl forming device (straight air stream without occurrence of swirling).

Since the degree of an advance of the ignition timing is not corrected in accordance with the actual state of operation or non-operation of the variable swirl forming device in such a conventional ignition timing controller for an engine, an ignition advancing map selected in accordance with the state of the engine may not conform with the state of swirling corresponding to the thus-selected ignition advancing map during malfunction of the variable swirl forming device or in a transition period such as a delay in response of the variable swirl forming device.

In other words, problems such as surging (irregular combustion) and a reduction to the power output of the engine arise due to a reduction in the combustion velocity if an intake air flow is in a straight state at the time of selection of an L-FB ignition advancing map. If the intake air flow is in a swirling state at the time of selection of a non-L-FB swirling state, there is a possible inconvenience of knocking.

SUMMARY OF THE INVENTION

An object of the present invention is to solve these problems and hence to provide an ignition timing controller for an engine, which ignition timing controller can materialize a required ignition timing command value conforming with an ignition advancing value of the engine by correcting the degree of an advance of ignition further in accordance with the swirling or straight state of an intake air stream upon correction of the ignition advancing degree in an air/fuel ratio control.

In one aspect of this invention, there is thus provided an ignition timing controller for an engine, which comprises:

a variable swirl forming means for changing the state of an air stream, which is flowing into an intake port, into a swirling state in a specific operation zone of the engine and into a straight state in an operation zone other than the specific operation zone;

a first ignition timing setting means for setting an ignition timing which is suitable when the air stream is in the swirling state and the engine is in the specific operation zone;

a second ignition timing setting means for setting another ignition timing which is suitable when the air stream is in the straight state and the engine is in the operation zone other than the specific operation zone;

an operation zone detecting means for detecting the operation zone of the engine;

an ignition timing change-over means for receiving a detection signal from the operation zone detecting means and selecting ignition timing information from the first ignition timing setting means when the engine is in the specific operation zone or ignition timing information from the second ignition timing setting means when the engine is in the operation zone other than the specific operation zone;

a swirl detection means for detecting an actual operational state of the variable swirl forming means; and a swirl ignition timing correction means for correcting, by a desired correction value, the ignition timing information from one of the first ignition timing setting means and second ignition timing setting means on the basis of the actual operational state of the variable swirl forming means detected by the swirl detection means.

According to the engine ignition timing controller of this invention, the following advantages or merits can be brought about in spite of its simple construction.

(1) Information on the ignition timing, which has been corrected as a result of a control performed dependent on the air/fuel ratio, is corrected further in accordance with the swirling or straight state of the intake air stream, so that a required ignition timing command value conforming with the ignition timing required for the engine can be materialized.

(2) Since the correction to the degree of an advance is effected in accordance with the actual state of activation or inactivation of the variable swirl forming device, the ignition timing information selected in accordance with the state of the engine and the swirling or straight state corresponding to the thus-selected ignition timing information do not differ even upon malfunction of the variable swirl forming apparatus or even in a transition period such as delay in response of the variable swirl forming apparatus.

(3) Even when an L-FB ignition advancing map has been selected by way of example and the intake air stream is in a straight state, the occurrence of surging (irregular combustion) or an engine power drop can be prevented owing to the above advantage (2). Further, there is no inconvenience of knocking owing to the above advantage (2) even when a non-L-FB ignition advancing map has been selected and the intake air stream is in a swirling state.

BRIEF DESCRIPTION OF THE DRAWINGS

FIGS. 1 through 19 illustrate an ignition timing controller according to one embodiment of this invention, which is suitable for use with an engine.

FIG. 1 is a block diagram showing the overall construction of the controller schematically;

FIG. 2 is a schematic illustration showing a variable swirl forming device of the controller in a vertical cross-section;

FIG. 6 is a schematic illustration showing a modification of the variable swirl forming device;

FIG. 8 is a waveform diagram showing operation characteristics of the device depicted in FIG. 6;

FIG. 9 is a block diagram of a valve drive means employed in the device shown in FIG. 6;

FIG. 10 is a flow chart of a control program suitable for use in the device illustrated in FIG. 6;

FIG. 11 is a time-dependent variation characteristics diagram of the air/fuel ratio, A/F, in a combustion chamber for various positions of a shutter valve in the device of FIG. 6;

FIG. 13 is a flow chart illustrating the procedure for the correction of a map value for the shutter valve;

FIG. 14 is a graph showing the opening/closing operation of a swirl control valve of the device of FIGS. 2 and 6;

FIG. 15 is a graph showing a non-L-FB correction map for the device of FIGS. 2 and 6;

FIG. 16 is a graph showing an L-FB correction map at the time of warming-up;

FIG. 17 is a graph showing a retarding map which is governed by an air/fuel ratio and engine load at each specific engine revolution number;

FIG. 19 is a graph showing a lean burn zone.

DESCRIPTION OF THE PREFERRED EMBODIMENT

Figure 1:
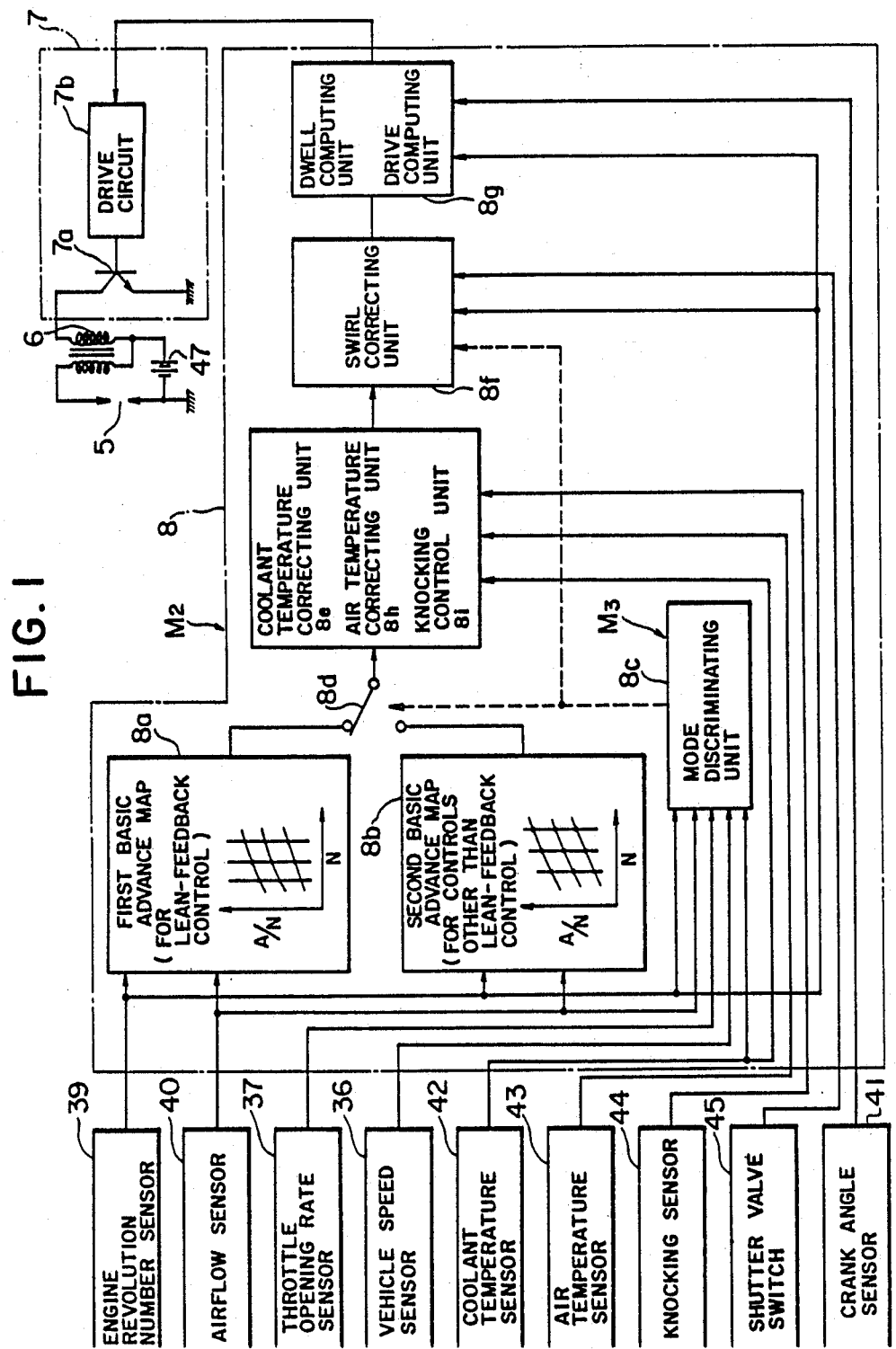

As illustrated in FIGS. 1–19, the present embodiment includes a variable swirl forming device $M_1$ ($M_1'$) and an ignition timing controller $M_2$. The variable swirl forming device is combined with an intake port 14 in each cylinder of a gasoline engine E so as to either form a strong swirl S in a corresponding combustion chamber, 17 (hereinafter called "swirling state" "strong swirling state ") or prohibit the occurrence of the strong swirl S (hereinafter called "straight state" state other than the swirling state). The combustion chamber 17 is formed in a space defined by a piston 2, which reciprocates up and down in a cylinder bore formed in a cylinder block 1, and a cylinder head 3 provided over the cylinder block 1. The ignition timing controller $M_2$ serves to control the ignition timing of each spark plug 5 arranged as an ignition means in such a way that its spark discharge portion is exposed in the combustion chamber 17 of the corresponding cylinder of the engine E.

Figure 2:
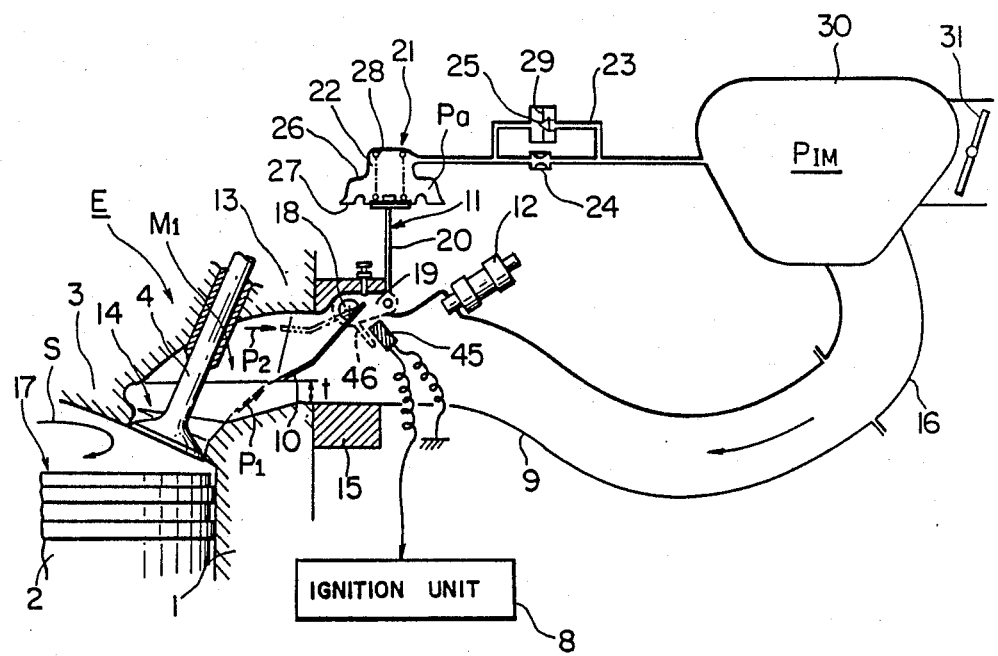

The construction of the variable swirl forming device $M_1$ is now described. As illustrated in FIG. 2, the variable swirl forming device $M_1$ is equipped with a shutter valve 10 as a swirl forming valve [swirl control valve (SCV)] and a valve drive means 11 for driving the shutter valve 10 with a pneumatic action. The variable swirl forming device $M_1$ is installed in an intake system of the gasoline engine, along with a fuel injection valve 12 of a fuel supply system (not illustrated) of the multipoint injection (MPI) system. The intake system is composed of an intake port 14 formed through a cylinder head 13, a spacer 15, an intake manifold 9, and an intake passage 16 formed in communication with an unillustrated air cleaner.

The inner wall of the intake port 14 presents a vortex pattern. The configuration of this vortex pattern is determined so as to impart swirling characteristics to an intake air stream passing through a gap t between the shutter valve 10 and the inner wall of the intake manifold 9 especially during a medium or low load period, which will be described subsequently, whereby the swirl S can be formed smoothly when the intake air flow has flowed into the combustion chamber 17.

Figure 3A:
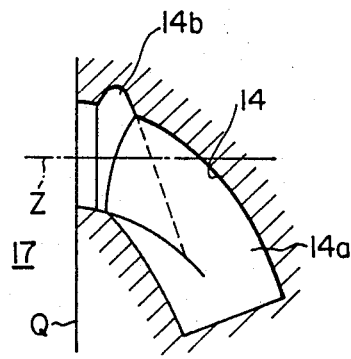
FIGS. 3(a), 3(b) and 3(c) are respectively a side cross-sectional view, top cross-sectional view and perspective view of a variable swirl port of the device.
Figure 3B:
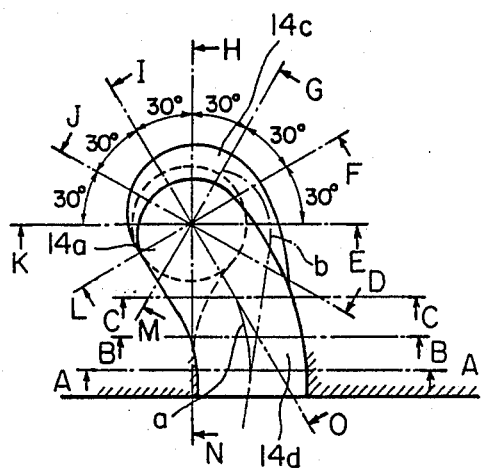
Figure 3C:
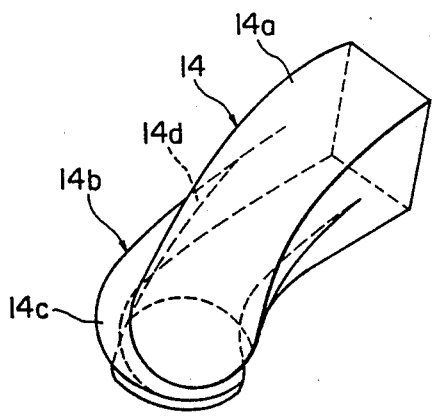
Figure 4A:
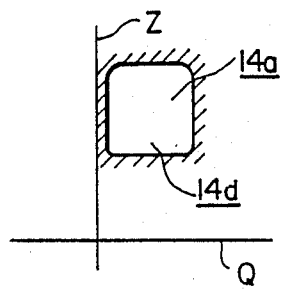
FIGS. 4(a), 4(b), 4(c), 4(d), 4(e), 4(f), 4(g), 4(h) and 4(i) are cross-sectional views taken along lines A—A, B—B, C—C, J-D, K-E, L-F, M-G, N-H and O—I of FIG. 3(b), respectively.
Figure 4B:
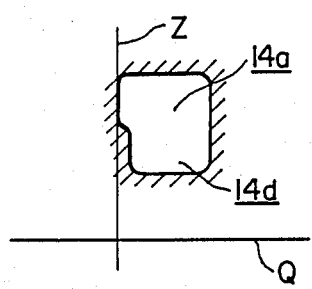
Figure 4C:
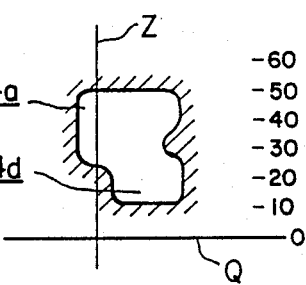
Figure 4D:
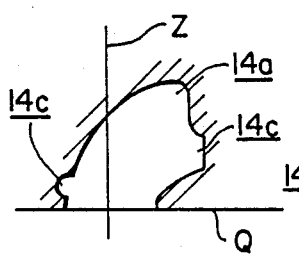
Figure 4E:
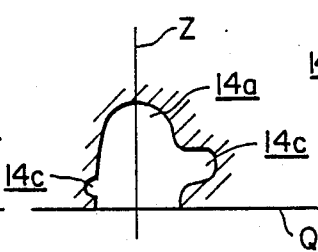
Figure 4F:
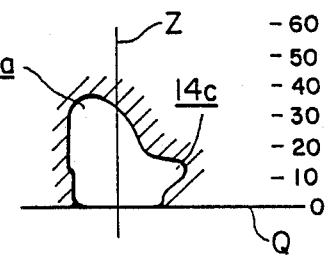
Figure 4G:
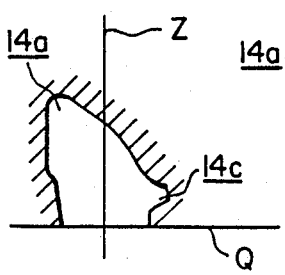
Figure 4H:
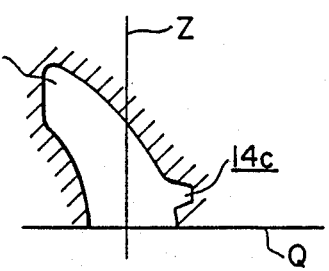
Figure 4I:
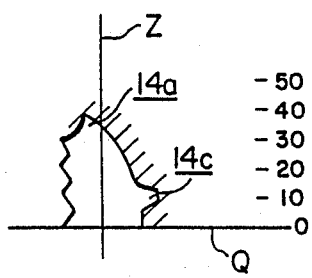
Figure 5A:
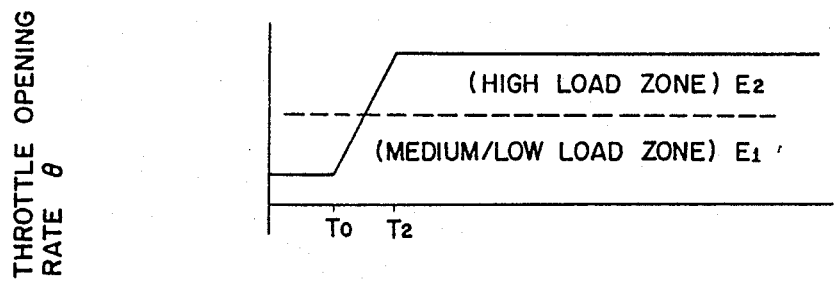
FIGS. 5(a), 5(b) and 5(c) are waveform diagrams showing operation characteristics of the device in FIG. 2, respectively.
Figure 5B:
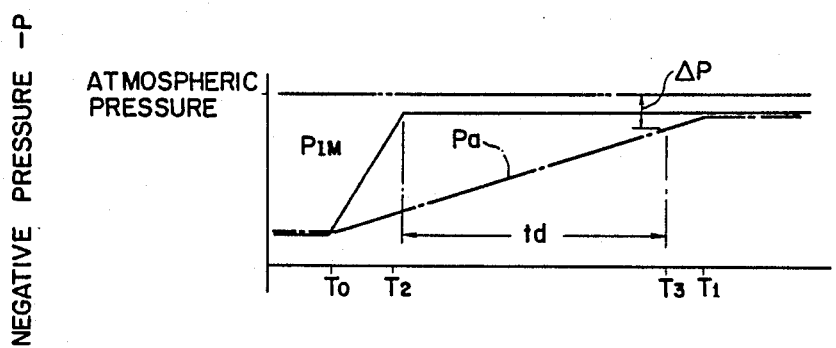
Figure 5C:
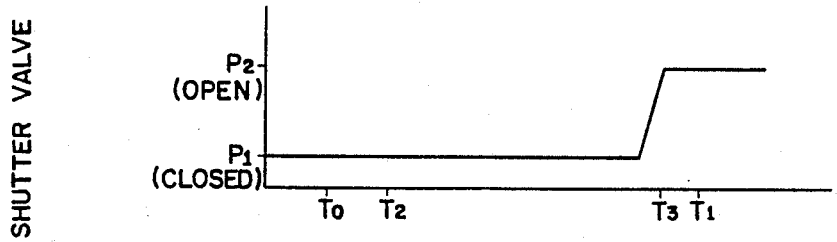

The intake port 14 is provided as a variable swirl port and as shown in FIGS. 3(a) through 3(c), has a composite transverse cross-sectional configuration composed of a straight portion 14a defining an upper part of the intake port along the air stream and a swirl portion 14b defining a lower part of the intake port along the air stream and the straight portion and swirl portion are integral with each other.

The straight portion 14a extends obliquely from the side wall of the cylinder head 3 toward the combustion chamber 17 and is formed in an arcuate shape as indicated by a flow passage center line a in FIG. 3(b), whereby air is allowed to flow downwardly and almost directly into the combustion chamber 17 without being accompanied by strong swirls On the other hand, the swirl portion 14b is composed of a swirl chamber 14c formed around the intake valve 4 and a straight section 14d connected tangentially to the swirl chamber 14c, as indicated by a flow passage center line b in FIG. 3(b). The swirl chamber 14c and straight section 14d are formed in such a way that air is allowed to flow in a direction tangent to the swirl chamber 14c from the straight section 14d and to flow into the combustion chamber 17 as a swirling stream in a state swirled strongly about the intake valve 4.

The cross-sectional configurations of the intake port 14 will next be described in further detail with reference to FIGS. 4(a), 4(b), 4(c), 4(d), 4(e), 4(f), 4(g), 4(h) and 4(i), while using an axis Z (the central axis of the intake valve 4) and a plane Q (the lower surface of the cylinder head 3) as references. The cross-sectional shape of an inlet portion is formed substantially into a square by way of example in FIG. 4(a). The straight portion 14a and the straight section 14d of the swirl portion 14b are arranged in an upper and lower parts of the cross-section, respectively. As depicted in FIGS. 4(b) through 4(i), its downstream-side portion is also formed of the straight portion 14a in an upper part and the swirl chamber 14c and straight section 14d of the swirl portion 14b in a lower part, and they terminate in the vicinity of the intake valve 4.

The air-fuel mixture, which is to be introduced into the combustion chamber 17, is therefore allowed to flow through the gap t underneath the variable swirl shutter valve 10 and then through a lower portion of the variable swirl port 14. Owing to the provision of the swirl portion 14b formed in a lower part of the variable swirl port 14, the swirl S is caused to occur in the combustion chamber 17. The swirl S is therefore allowed to occur effectively. The swirl ratio (the number of swirling of the intake air stream in the cylinder per each intake stroke) of the swirl at this time may be set, for example, at 5.

Even when the amount of intake air is little as in such a low-load operation, sufficient swirling can be developed and the combustion is hence performed efficiently. Excellent effects are thus obtained from the viewpoints of fuel cost, power output and measures for exhaust gas.

The shutter valve 10 is fixed at a base edge side thereof on a rotary shaft 18 supported pivotally on a spacer 15 and its turnable edge can swing between a closed position $P_1$, a swirl forming position for the valve, and an open position $P_2$, a retreated position for the valve. The valve drive means 11 is connected via a link 19 to a portion of the rotary shaft 18, which portion extends out through a spacer 15.

The valve drive means 11 is composed of a vacuum motor 21 connected to the link 19 by way of a connecting rod 20, a negative pressure tube 23 for guiding a negative intake manifold pressure $P_{IM}$ of a surge tank 30 to a negative pressure compartment 22 of a vacuum motor 21, and an orifice 24 and check valve 25 intermediate part of the negative tube 23.

The negative pressure compartment 22 of the vacuum motor 21 is composed of a casing 26 and a diaphragm 27, and a compression spring 28 housed inside the negative pressure compartment 22 urges the diaphragm 27 in a valve opening direction (in the downward direction).

As the compression spring 28, is used that having a spring force sufficient to maintain the shutter valve 10 at the closed position $P_1$ until the difference between the pressure Pa of the negative pressure compartment 22 and the atmospheric pressure reaches a specific value $\Delta P$ (see FIG. 5).

The check valve 25 is provided with a partition wall 29 which cuts down the flow path of the negative pressure tube 23. This also applies to the orifice 24. The check valve 25 prevents air from flowing into the negative pressure compartment 22 but allows air to flow out of the negative pressure compartment 22. The orifice 24 is formed in a shape constricted sufficiently compared with the degree of opening of the check valve 25, so that a sufficient degree of resistance is applied to the air flowing between the surge tank 30 and negative pressure compartment 22, in other words, a predetermined delay (namely, the time indicated by $t_d$ in FIG. 5) is required from their equalization in pressure.

A throttle valve 31 is provided further upstream the surge tank 30 on the upstream side of the intake manifold 9.

Let's now assume that an engine equipped with such a variable swirl forming device $M_1$ is driven and an unillustrated vehicle is running. Let's also assume that when after achieving a valve-opening initiation point $T_0$ from a medium/low load zone $E_1$, an operation for an acceleration has been effected [see FIG. 5(a)] and the opening rate $\theta$ of the throttle valve 31 has been increased to the side of a high-load zone $E_2$. Although the negative pressure compartment 22 and intake passage 16 have had the same level of negative pressure until the point $T_0$, a difference is developed in the level of negative pressure between the negative pressure compartment 22 and intake passage 16 owing to the combined function of the orifice 24 and check valve 25 as a valve-opening delaying means and this state continues up to a point $T_1$. In the course of this stage, the intake manifold negative pressure $P_{IM}$ is interlocked with the throttle valve opening rate $\theta$ so that the negative pressure is lowered and is stabilized at a point $T_2$ [see FIG. 5(b)].

On the other hand, the pressure $P_a$ of the negative pressure compartment 22 drops slowly. At a point $T_3$ where the pressure $P_a$ of the negative pressure compartment 22 reaches a value $\Delta P$ specified relative to the atmospheric pressure, the shutter valve 10 completes its change-over from a closed position $P_1$ to the open position $P_2$ [see FIG. 5(c)]. The time interval from the point $T_2$ to the point $T_3$ is hence the delay time $t_d$ of the shutter valve 10 and the shutter valve 10 remains closed from the point $T_2$ to the point $T_3$ in spite of the opening of the throttle valve 31. A large volume of air is accordingly allowed to flow through the gap t [see FIG. 12(b)] between the shutter valve 10 and the inner wall of the intake passage 16, so that a fuel adhering in the form of a liquid film in the vicinity of the gap t is blown off toward the combustion chamber 17.

As a result, the fuel is injected at an accelerated velocity and in an increased amount from the ignition valve 12 during the delay time $t_d$. Even if the fuel adheres in the form of liquid films on the wall f the intake manifold 9 or shutter valve 10 or the intake port 14, such an adhered portion of the fuel can also be mixed in the large amount of the intake air stream so that the degree of leaning in the combustion chamber 17 at the time of the initiation of an acceleration can be reduced sufficiently compared with conventional methods, namely, characteristics close to those indicated by a solid line in FIG. 11 can be achieved.

Figure 6:
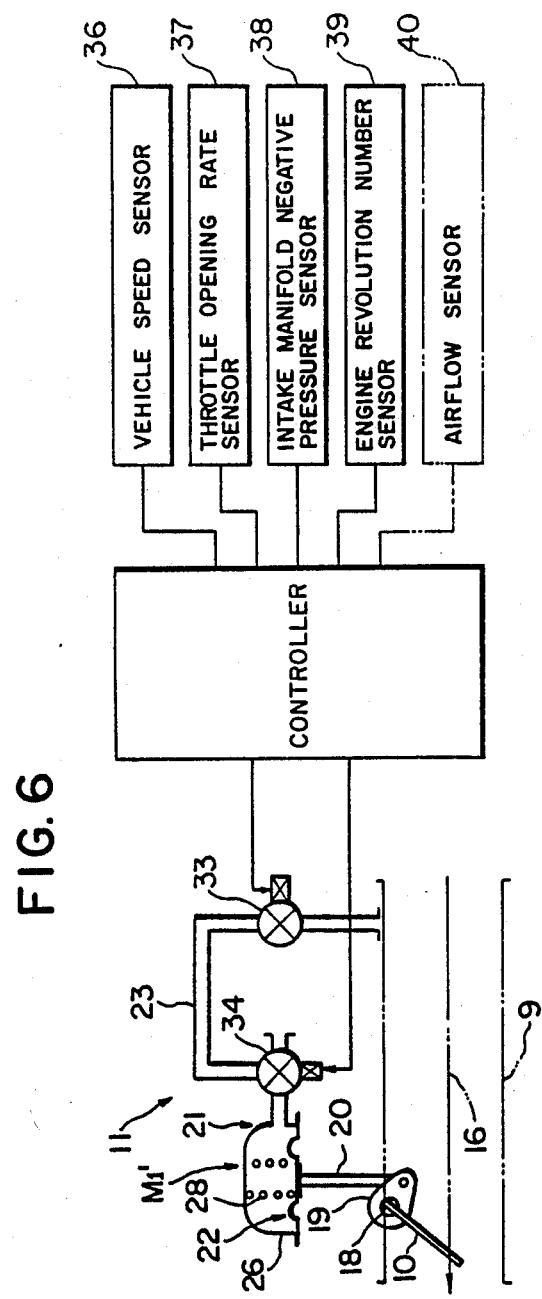

One modification of the variable swirl forming device is illustrated by way of example in FIG. 6. The device $M_1'$ has the same structure as the variable swirl forming device $M_1$ except that a pair of electromagnetic valves 33,34 and a controller 35 for controlling the valves 33,34 are used in place of the orifice 24 and check valve 25 provided as a valve-opening delaying means in the negative pressure tube 23.

The variable swirl forming device $M_1'$ drives, by the negative pressure of the intake passage 16, the vacuum motor 21 in the valve drive means 11 which serves to drive the shutter valve 10. The intake passage 16 is provided with a first electromagnetic valve 33 and a second electromagnetic valve 34. The former valve 33 opens the flow path of the negative pressure tube 23 when energized but closes same when deenergized. On the other hand, the latter valve 34 brings the negative pressure compartment 22 and negative pressure tube 23 into mutual communication when energized but opens the negative pressure compartment 22 into the atmosphere and closes the negative pressure tube 23 when deenergized.

A principal part of a controller 35 which drives both electromagnetic valves 33,34 is composed of a microcomputer. Connected to the microcomputer are a vehicle speed sensor 36 for outputting information on the vehicle speed, throttle opening rate sensor 37 for outputting information on the throttle opening rate, an intake manifold negative pressure sensor 38 for outputting information on the negative pressure in the intake manifold, and an engine revolution number sensor 39 for outputting information on the revolution number of the engine. Incidentally, it may be feasible to use the engine revolution number sensor 39 and an air volume sensor (airflow sensor) 40, which outputs information on the volume of intake air, as indicated by a two-dot chain line so as to obtain information on the load instead of information on the negative pressure in the intake manifold.

Figure 9:
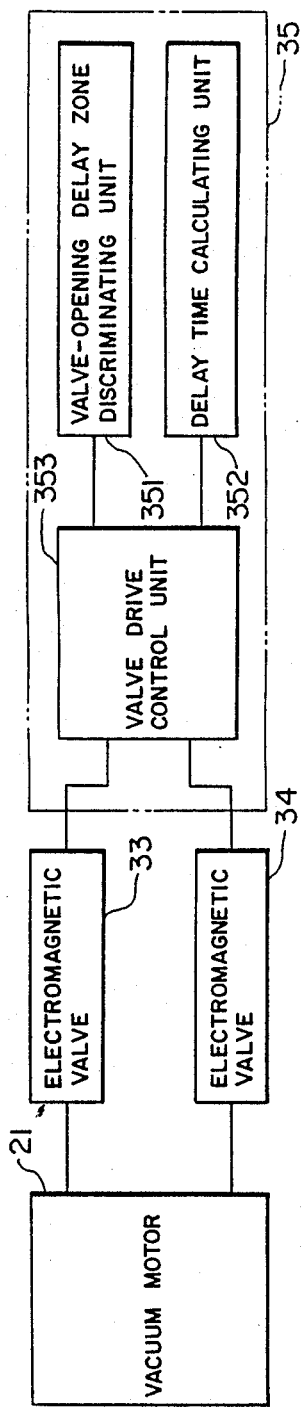

In place of the functions which the valve-opening delaying means of the variable swirl forming device $M_1$ has, the controller 35 in the valve drive means is equipped firstly with a function as a valve-opening zone discriminating unit 351 for discriminating whether or not the current operation zone is in the valve-opening delaying zone C, further with a function as a delay time calculating unit 352 for calculating the valve-opening delaying time $t_d$, and moreover with a function as a valve drive control unit 353 for selectively operating both electromagnetic valves on the basis of results of the discrimination by the unit 351 and the delaying time calculated by the unit 352 (see FIG. 9). For this purpose, an ROM (read-only memory) of the computer is loaded in advance with a valve-opening delaying zone calculating map for calculating the valve-opening delaying zone C determined by the engine revolution number N and the intake manifold negative pressure $P_{IM}$ (or the intake flow rate A/N per revolution in some instances), such as that shown in FIG. 7(a), and also with a map for calculating the delay time td determined by the engine revolution number N and intake manifold negative pressure $P_{IM}$, such as that depicted in FIG. 5(b).

Figure 10:
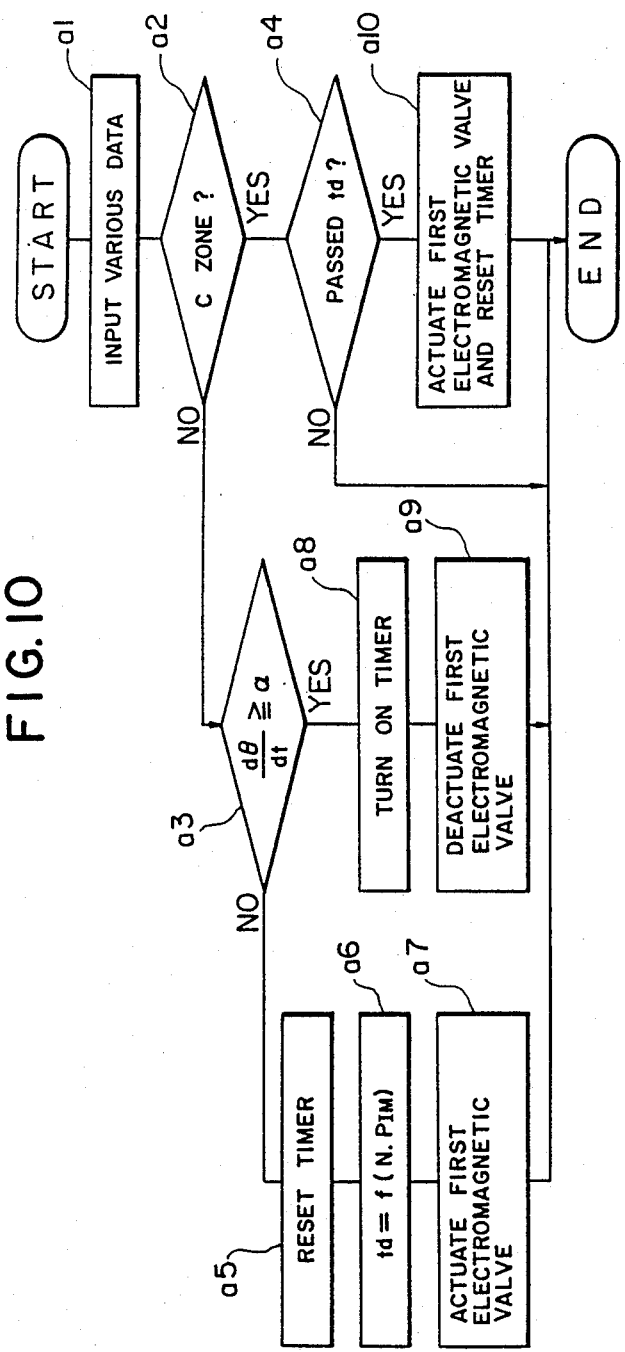
Figure 11:
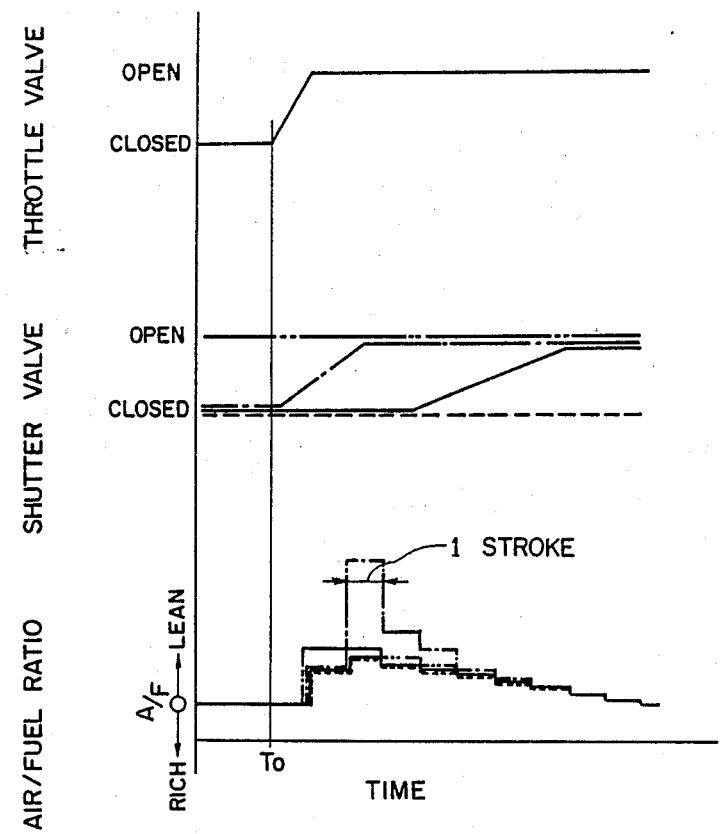

A control program for such a computer as that employed in the controller 35 is shown in FIG. 10.

When this control program starts, various data, namely, the vehicle speed, engine revolution number, throttle opening rate and intake manifold negative pressure value are inputted first of all in Step a1.

Incidentally, the throttle opening rate $\theta$ is inputted successively by a time-division technique of a predetermined interval, its derivative $d\theta/dt$ (the angular velocity of the valve upon its opening) is calculated successively, and the resulting data are input in a predetermined memory area for further processing.

Figure 7A:
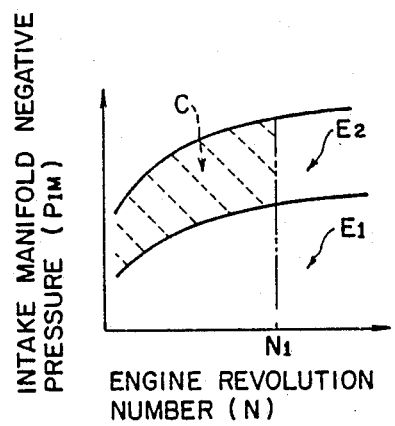
FIGS. 7(a) and 7(b) are respectively concept diagrams of a valve-opening delaying zone calculating map and delaying-time calculating map suitable for use by a controller in the device depicted in FIG. 6.
Figure 7B:
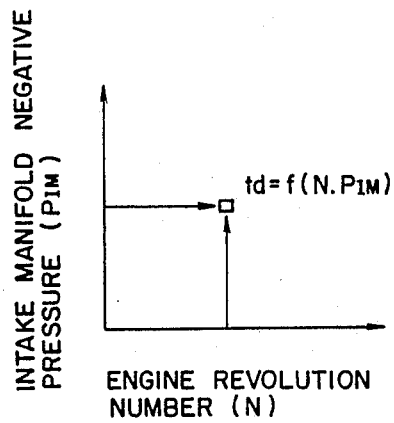

Moreover, an unillustrated second electromagnetic valve drive routine is also performed by a time-division technique in such a way that the second electromagnetic valve 34 is deenergized to assume continuously its open position $P_2$ when the engine revolution number N exceeds a prescribed value [the threshold value of the engine revolution number shown in FIG. 7(a)] $N_1$ but the second electromagnetic valve 34 is energized to assume continuously its closed position $P_1$ when the engine revolution number N becomes smaller than the threshold value $N_1$.

When the routine advances to Step a2, the engine revolution number N and intake manifold negative pressure $P_{IM}$ are computed here on the basis of the valve-opening delaying zone calculating map so as to determine whether the current operation zone is in the valve-opening delaying zone C or not. The routine proceeds to Step a3 when the current operation zone is the medium/low load zone $E_1$, while the routine proceeds to Step a4 when the current operation zone is the valve-opening delaying zone C, i.e., in the high load zone $E_2$ on the contrary.

When the routine has reached Step a3, namely, when the current operation zone is the medium/low load zone $E_1$, a judgement is made whether the derivative of the throttle valve opening rate at that time is greater or smaller than a predetermined value $\alpha$ (a threshold value at or over which an acceleration is deemed to have taken place; this value should be determined in advance). When the derivative is smaller, the routine advances first of all to Step a5 and resets a timer (not shown) in the computer and maintains it in a start standby mode. Then, the delay time $t_d$ after the initiation of the acceleration in the current operation zone is calculated from a three-dimensional map such as that shown in FIG. 7(b), namely, from $t_d = f(N, P_{IM})$. Thereafter, the first electromagnetic valve 33 is maintained in the energized state, and the routine returns.

Figure 8:
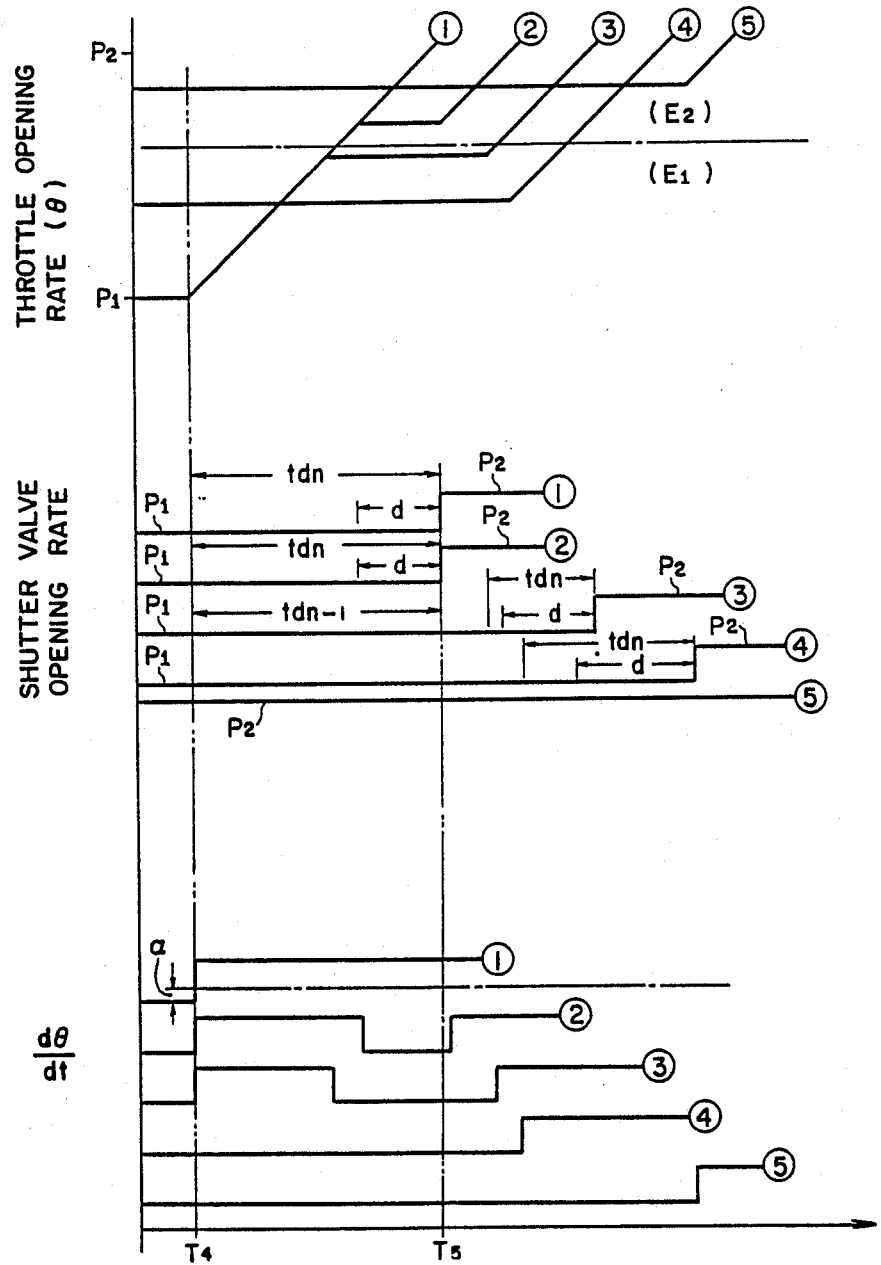

When the routine has reached Step a3 again, $d\theta/dt$ has exceeded $\alpha$ and an acceleration has taken place, namely, Line ① in FIG. 8 has passed through the time point $T_4$, the routine proceeds to Step a8. The timer is turned on here and the count of the latest delay time $t_{dn}$, which has been determined by that time, is started. Further, the first electromagnetic valve 33 is deenergized, namely, the shutter valve 10 is maintained in its closed position $P_1$, and the routine returns.

When the routine has reached Step a2 again and the current operation zone has reached the valve-opening delaying zone C (namely, the time point $T_4$ has been passed by in FIG. 8), the routine advances to Step a4 to determine whether the count of the time has exceeded $t_{dn}$ or not. The routine remains there until the count of the timer reaches $t_{dn}$. When the count has exceeded $t_{dn}$ (the point $T_5$ has been passed by), the routine advances to Step a10, where the first electromagnetic valve 33 is energized to allow the air on the side of the surging tank 30 to flow into the negative pressure compartment 22 through the negative pressure tube 23, in other words, to reduce the negative pressure, whereby the shutter valve 10 is switched over to the open position $P_2$ and is held there by the action of the compression spring 28.

Figure 12A:
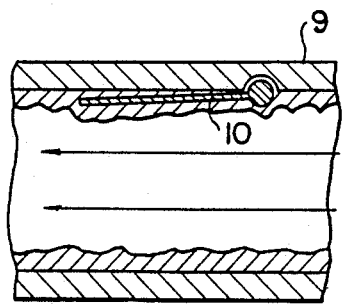
FIGS. 12(a) and 12(b) schematically illustrate the operation of the shutter valve.
Figure 12B:
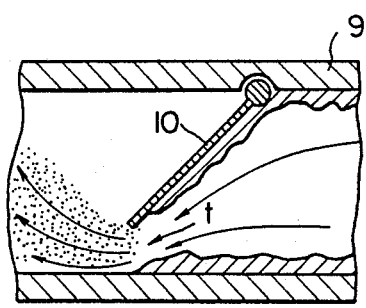

Owing to such delayed opening characteristics of the shutter valve 10, the possible reduction of the fuel to be fed to the combustion chamber 17 in the initial stage of initiation of an acceleration is prevented by the blowing of the fuel adhered in the form of a liquid film [see FIG. 12(b)] and moreover, the shutter valve 10 is opened immediately and fully after the lapse of the delay time, thereby permitting the assurance of intake of air in a sufficient volume. The acceleration responsibility of an engine equipped with such an intake system can be improved accordingly.

Incidentally, numerals ② and ⑤ in FIG. 8 indicate respectively waveforms of the throttle opening rate $\theta$, shutter valve opening rate and throttle valve angular speed $d\theta/dt$ in different acceleration modes. Further, letter d indicates an actual delay time.

In the above embodiment, the pneumatic actuator is used as the valve drive means 11. As an alternative, the valve drive means 11 may also be constructed by connecting the movable core of a solenoid (not shown) directly to the link 19 of the shutter valve 10 and then actuating the solenoid by a means similar to the controller 35 mentioned above. Advantageous effects similar to those brought about by the controller 35 of the variable swirl forming device $M_1'$, which controller 35 is shown in FIG. 9, can also be obtained in this modification.

Using the variable swirl forming device $M_1$ or $M_1'$ described above, air/fuel ratios A/F of each combustion chamber 17 were measured respectively when the shutter valve 10 was opened simultaneously with the valve-opening starting time $T_0$ of the throttle valve 31 (indicated by a one-dot chain line), when the shutter valve 10 was always kept open (indicated by a two-dot chain line), when the shutter valve 10 was always kept closed (indicated by a broken line), and when the opening of the shutter valve 10 was delayed by a predetermined time period from the valve-opening starting time $T_0$ of the throttle valve 31 (indicated by a solid line). It has been found from the results that the leaning in the combustion chamber 17 can be minimized most when the shutter valve 10 is always closed or is opened with a delay for a predetermined period of time at the time of the initiation of an acceleration. As possible reasons for this, it may be mentioned that when the shutter valve 10 is choked in an initial stage of an abrupt increase of the volume of intake air as shown in FIG. 12(b), the fuel adhered in the form of a liquid film on the inner wall of the intake manifold 9 as illustrated in FIG. 12(b) is blown off by the great deal of the intake air stream so as to prevent the concentration of the fuel in the air-fuel mixture from lowering.

The ignition timing controller $M_2$ is composed, as shown in FIG. 1, of an ignition unit 8 connected via an ignition control unit 7 to an ignition coil 6 which is in turn connected to each ignition plug 5.

The ignition unit 8 receives signals from the vehicle speed sensor 36, the throttle opening rate sensor 37, the engine revolution number sensor 39, the airflow sensor 40, a crank angle sensor (reference signal generator) 41, a coolant sensor 42, an intake air temperature sensor 43, a knocking sensor 44 and a swirl control valve switch (SCV switch) 45, and outputs an optimal ignition timing signal for each cylinder through a corresponding output line. The ignition timing signal may be outputted as an off signal for a power transistor 7a, for example, at the time of MBT (minimum advanced for best torque timing).

Here, the crank angle sensor 41 generates the reference signal at every crank angle of 180° in a 4-cylinder engine E. The airflow sensor 40 and engine revolution number sensor 39 detect as load sensors the engine load, for example, in relation with the throttle opening rate, manifold pressure or intake air volume A and the engine revolution number N. The engine revolution sensor 39 detects the number of revolutions of the engine, while the coolant temperature sensor 42 detects the temperature of the coolant.

On the other hand, the intake air temperature sensor 43 detects the temperature of the intake air, whereas the knocking sensor 44 detects knocking of the engine E.

In addition, the swirl control valve switch (SCV switch) 45 is, as shown in FIGS. 1 and 2, a switch which is pressed and turned on by a switch finger 46 attached to the link 19 while the shutter valve 10 is closed fully (in a state closed with the narrow gap t). Incidentally, the engine revolution number sensor 39 may be replaced by the crank angle sensor 41 and a clock built in the ignition unit 8. It is also possible to detect with the crank angle sensor 41 a signal per every degree of the crank angle, a signal at a point retarded or advanced by a predetermined angle from the top dead center, etc.

The ignition unit 8 is also constructed to output a sparking angle signal (dwell angle signal), which sets the optimal timing for the initiation of feeding of a current to each ignition coil 6, from the corresponding output line. The output timing of the signal varies depending on the engine revolution number. It may be outputted as an "ON" signal, for example, at a point about 90° in advance of the top dead center.

The ignition unit 8 is equipped with a dwell computing unit and drive computing unit 8g as a standard ignition timing determining means for determining the standard ignition timing $\theta_0$ (this standard ignition timing $\theta_0$ is set at 0° when a specific cylinder is in a particular phase) of the engine E upon receipt of a detection signal from the crank angle sensor 41; a first ignition timing correcting means 8a for setting an L-FB first basic advancing map for the memory by using, as a first correction value (degree of retardation), a retardation degree $\theta_{S1}(N,A)$ from the standard ignition timing signal corresponding to the L-FB state, which is the first air/fuel state of the engine E, upon receipt of detection signals respectively from the engine revolution number sensor 39 and airflow sensor 40; and a second ignition timing correcting means 8b for setting a non-L-FB second basic advancing map for the memory by using, as a second correction value (degree of retardation), a retardation degree $\theta_{S2}(N,A)$ from the standard ignition timing signal corresponding to the non-L-FB state, which is the second air/fuel state of the engine E, upon receipt of detection signals respectively from the engine revolution number sensor 39 and airflow sensor 40. In addition, the ignition unit 8 is also provided with a mode discriminating unit 8c for receiving detection signals respectively from the vehicle speed sensor 36, throttle opening rate sensor 37, engine revolution number sensor 39, airflow sensor 40 and coolant temperature sensor 42 and discriminating whether the engine is in the lean burn feed back state (see FIG. 16) or in another state (see FIG. 15); a change-over switch 8d for receiving a mode discriminating signal from the mode discriminating unit 8c and selecting the aforementioned first ignition timing correction means 8a when the engine is in the L-FB state and the above-mentioned second ignition timing correction unit 8b when the engine is in a state other than the L-FB state; a coolant temperature correcting unit 8e for determining the coolant temperature correction value $\theta_{WT}$ upon receipt of a detection signal from the coolant temperature sensor 42; an air temperature correcting unit 8h for correcting an air temperature correction value $\theta_{AT}$ upon receipt of a detection signal from the air temperature sensor 43; a knocking control unit 8i for determining a knocking correction value $\theta_N$ upon receipt of a detection signal from the knocking sensor 44; and a swirl ignition timing correcting unit 8f for further correcting a corrected ignition timing $\theta_{S1}$ or $\theta_{S2}$ from selected one of the first and second ignition timing correction units by a desired correction value $\theta_{SS}$, which is in a functional relation with the engine revolution number N, upon receipt of detection signals respectively from the engine revolution number sensor 39, SCV switch 45 and mode discriminating unit 8c.

An ignition-timing correction value changeover means M3 is composed of the mode discriminating unit 8c and changeover switch 8d.

The swirl ignition timing correcting unit 8f determines a re-correction value (the desired correction value) $\theta_{SS}$ in accordance with the following equation as will be described subsequently.

$$\theta_{SS} = 4 \times N/1000 \tag{1}$$

When the corrected ignition timing $\theta_{S1}$ from the first ignition timing correction means has been selected, $\theta_{SS}$ takes a positive value. $\theta_{SS}$ however takes a negative value when the corrected ignition timing $\theta_{S2}$ from the second ignition timing correction means has been selected. Expressing by $\theta_S$ the value corrected further by the third correction value $\theta_{SS}$, $\theta_S$ may be defined by the following equations (2) and (3):

$$\theta_S = \theta_{S1} + \theta_{SS} \tag{2}$$

$$\theta_S = \theta_{S2} - \theta_{SS} \tag{3}$$

The correction of the swirl ignition timing is performed by selecting either one of the above equations (2) and (3).

In the above-described control of the ignition timing, a judgement is made on the basis of inputs from the various sensors 36-45 which one of the following operation modes the engine is in. The coil current is then cut off with an optimal ignition timing $\theta$ for the operation mode.

For example, the optimal ignition timing $\theta$ may be determined by the following equations:

$$\theta = \theta_0 + \theta_{AT} + \theta_{WT} + \theta_N + \theta_{S1}\theta_{SS} \tag{4-1}$$

$$\theta = \theta_0 + \theta_{AT} + \theta_{WT} + \theta_N + \theta_{S2} - \theta_{SS} \tag{4-2}$$

Outputs from the ignition unit 8 are inputted to the individual ignition control units 7. Each cylinder is provided with one of the ignition control units 7. The ignition control units 7 are of the same construction and are each equipped with the power transistor 7a and a drive circuit 7b.

The power transistor 7a functions as a switching device for a charge/discharge circuit which includes the ignition coil 6. Its base (control terminal) is connected to an output terminal of the drive circuit 7b, so that energy accumulated in the ignition coil 6 is discharged when the power transistor 7a is turned on and energy is accumulated in the ignition coil 6 when the power transistor 7a is turned off.

Incidentally, numeral 47 indicates a battery in FIG. 1.

Figure 13:
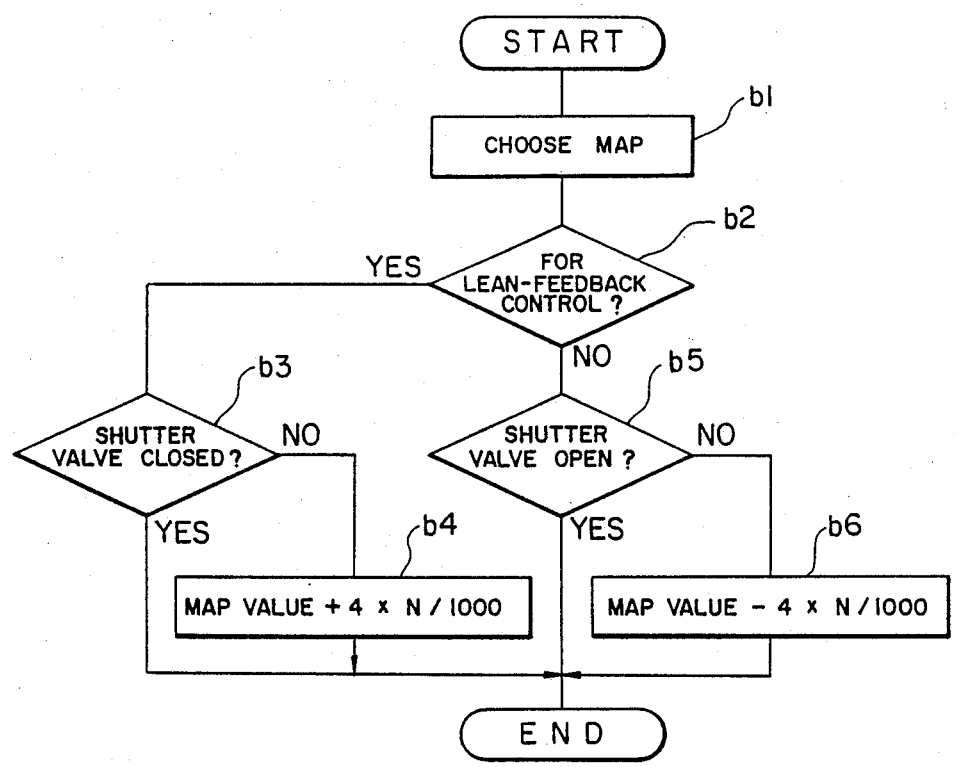
Figure 14:
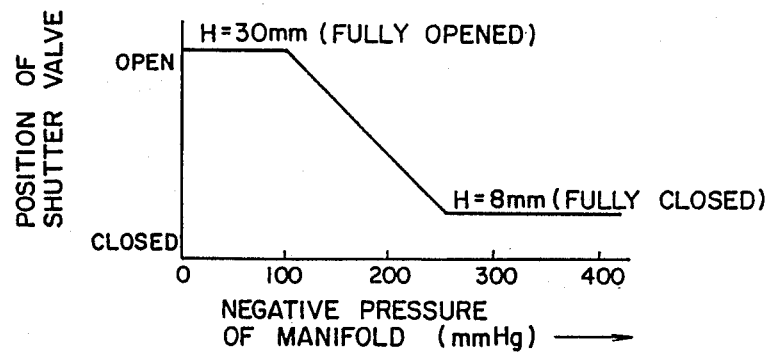
Figure 15:
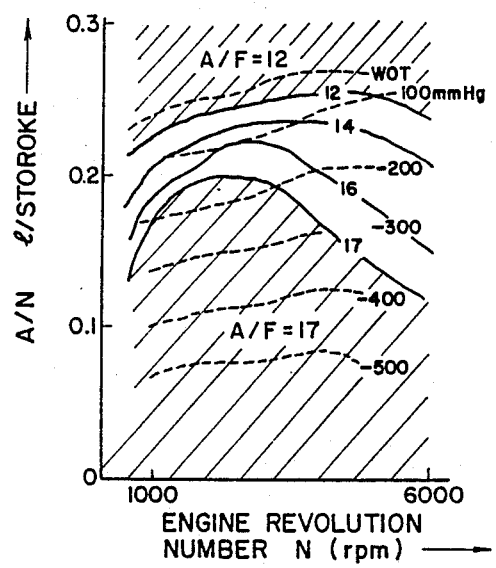
Figure 16:
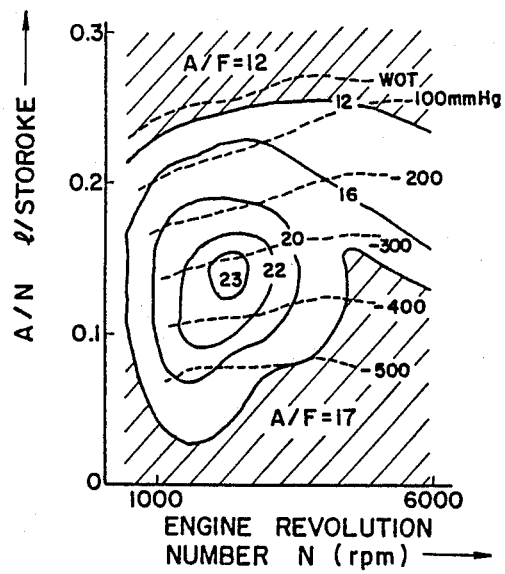
Figure 19:
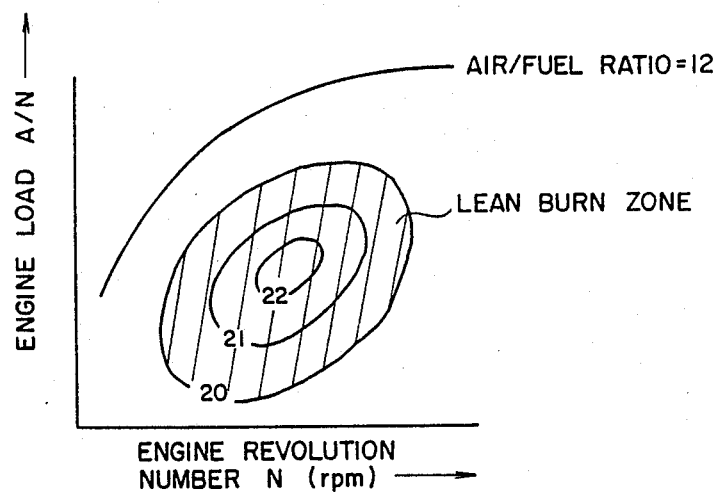

Since the engine ignition timing controller according to the one embodiment of this invention is constructed as described above, a map is selected first of all (Step b1) as shown in FIG. 13. As illustrated in FIGS. 1 and 19, the ignition timing correction value changeover means M3 selects a first basic advancing map when the engine revolution number N and load A/N are in their respective predetermined zones, normally, at the time of a warm-up operation and otherwise, a second basic advancing map.

A judgement is next made which map has been selected (Step b2). When the L-FB map has been selected, another judgement is made in Step b3 whether the shutter valve 10 is in an open state or not. When it is in the open state, the map value $\theta_{S1}$ is corrected in the following manner (Step b4).

$$\theta_S = \theta_{S1} + \theta_{SS} \tag{5}$$
$$= \theta_{S1} + 4 \times N/1000$$

When the L-FB map has been selected and the shutter valve 10 is in a closed state, the correction of the map value $\theta_{S1}$ is not performed and the correction of the swirl ignition timing is not effected, because the first basic advancing map stores the degrees of advances required when the shutter valve 10 is in its closed state.

When the selection of the non-L-FB map has been found in Step b2, a judgement is made in Step b5 whether the shutter valve 10 is in a closed state or not. When the shutter valve 10 is in its closed state, the map value $\theta_{S2}$ is corrected in the following manner (Step b6).

$$\theta_S = \theta_{S2} + \theta_{SS} \tag{6}$$
$$= \theta_{S2} - 4 \times N/1000$$

When the non-L-FB map has been selected and the shutter valve 10 is in an open state, the correction of the map value $\theta_{S2}$ is not performed and the correction of the swirl ignition timing is not effected, because the second basic advancing map stores the degrees of advances required when the shutter valve 10 is in its open state.

Figure 17:
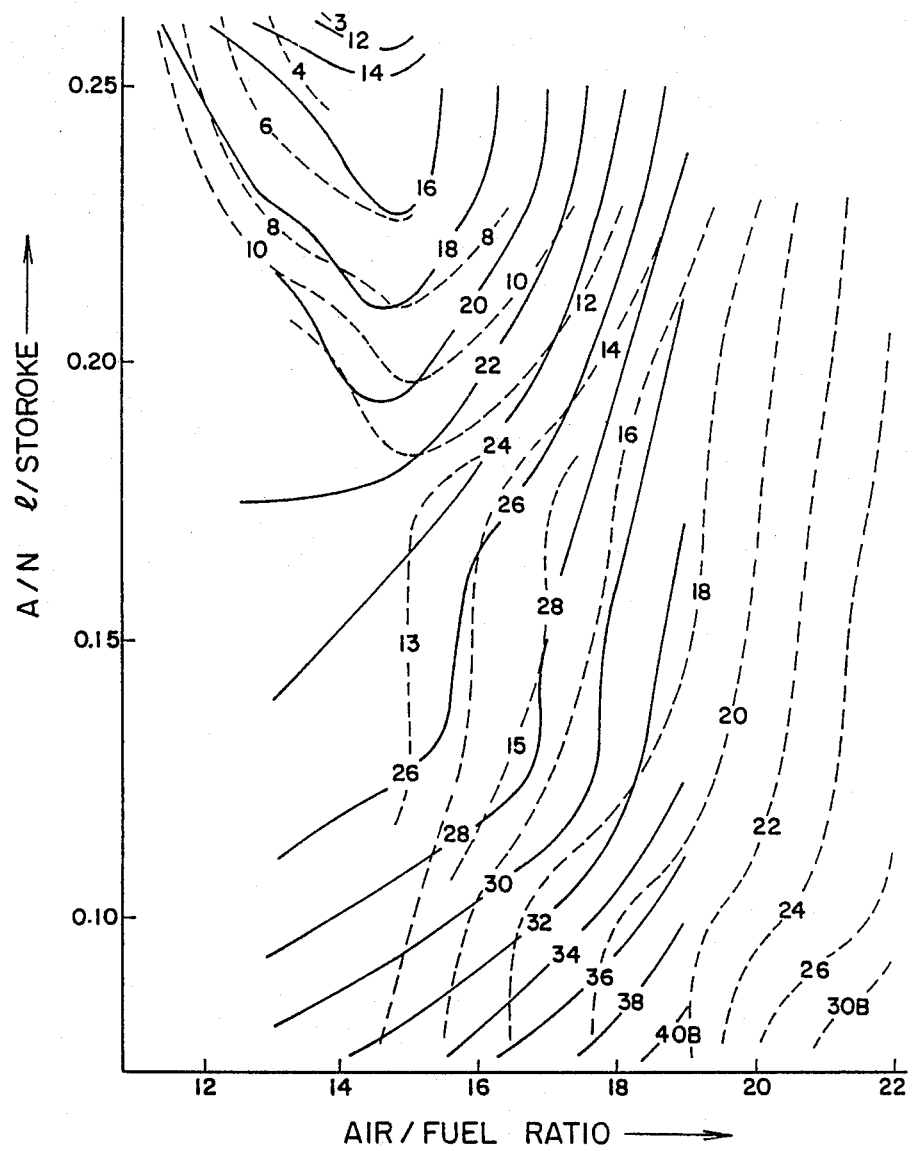

Regarding the corrections of the map values $\theta_{S1}, \theta_{S2}$, it has been empirically confirmed as described above that ignition timings such as those indicated by solid lines in FIG. 1 are required when the shutter valve 10 is in its fully-opened state under prescribed revolution numbers of the engine. Similarly, it has also been confirmed empirically that ignition timings such as those indicated by broken lines in FIG. 17 are required when the shutter valve 10 is in its fully-closed state.

Fully satisfactory effects can hence be obtained even when an approximation is effected in accordance with the above equation (5) or (6).

Figure 18A:
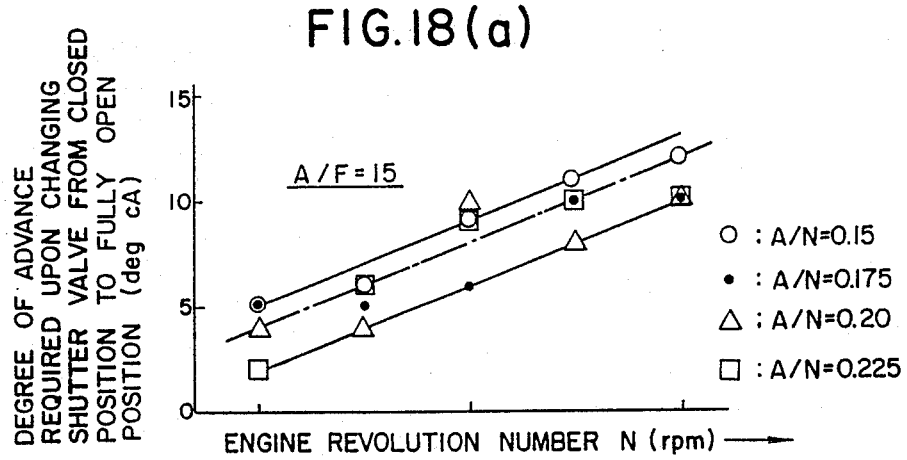
FIGS. 18(a), 18(b) and 18(c) are graphs showing, as a function of engine revolution number, the degree of an advance required upon changing the swirl control valve from a closed state into a fully opened state, respectively, at specific air/fuel ratios.
Figure 18B:
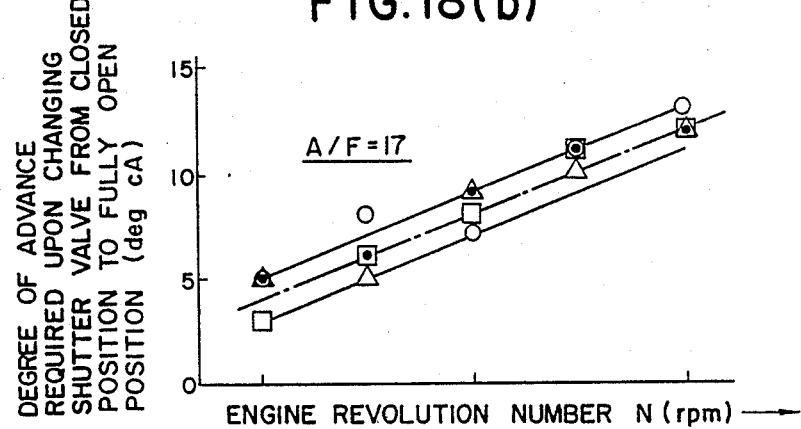
Figure 18C:
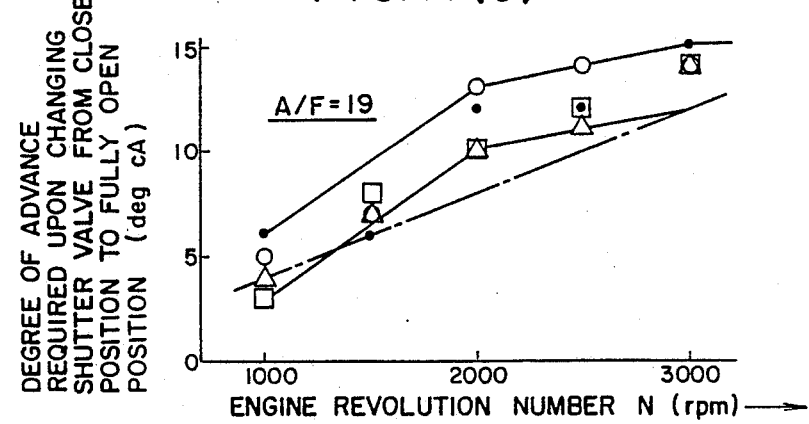

In particular, the degree of an advance required upon displacement of the shutter valve 10 from a closed state to the fully open state is as shown in FIGS. 18(a)–18(c). The correction term $\theta_{SS}$ in the aforementioned equations (5) and (6) may hence be determined in accordance with the following equation.

$$\theta_{SS} = (\text{deg}) \approx (\text{rpm}) \times 4/1000 \tag{7}$$

As has been described above, the ignition timing control of the SCV-equipped lean burn type MPI engine is effected upon start-up and ID (idling), and in an independent knocking control of each cylinder under high load conditions, a control upon return to an F/C (fuel cut) mode, a usual map control, and a dwell angle control. The usual map control performed on the SCV-equipped MPI engine is however different from conventional map controls in the following points.

Fundamentally, there are two types of air/fuel ratio maps, i.e., one for L-FB and the other for non-L-FB as described above. Further, an S(stoichio)-FB control may be performed transitionally.

The shutter valve 10 is normally closed under a low/-medium load and opened fully under a high load. However, the shutter valve 10 is fully opened with a delay even at the time of abrupt full opening of the throttle valve because the full opening of the shutter valve 10 is effective not only for an improvement to the inflammability limit but also for the delay in fuel transportation.

Since the thus-set air/fuel ratio and opening rate of the shutter valve (SCV) 10 affect the required ignition timing, they must be taken into consideration upon controlling the ignition timing.

The required degree of advance, which has taken MBT and $NO_x$ into consideration, was thus determined under various operation conditions (N-A/N-A/F) for both opening and closure of the shutter valve (SCV) 10 as illustrated in FIG. 17. It has been found clearly that the shutter valve (SCV) 10 affects considerably on the air/fuel ratio.

The present ignition timing control has two ignition advancing maps, which are used selectively, i.e., one for L-FB control only and the other for non-L-FB control. In an SCV-equipped engine, the shutter valve (SCV) 10 is both opened and closed in each mode. It is necessary to meet this operational feature.

As illustrated in FIGS. 18(a)–18(c), the difference between the degree of an advance required during opening of the shutter valve (SCV) 10 and that required during its closure in each operation mode is substantially correlated with the revolutionary speed of the engine. This correlation may be typified by difference $=4\times N/1000$ when A/F<17, although it varies depending on the air/fuel ratio.

First of all, the detection of opening or closure of the shutter valve (SCV) 10 is effected by the swirl control valve switch 45 which is adapted to detect the full closure of the shutter valve (SCV) 10. Results of the detection is then inputted in the ignition unit 8 to perform matching of an ignition advancing map in the following manner.

In an L-FB control map, the degrees of required advances corresponding to an air/fuel ratio map (W/FB-A/F map) for a feedback control making use of an $O_2$ sensor are set, assuming as a prerequisite that the shutter valve (SCV) 10 is closed. In a non-L-FB control map on the other hand, the degrees of required advances corresponding to a non-feedback map (W/O-FB map) (A/F<15) are set, assuming as a prerequisite that the shutter valve (SCV) 10 is opened.

Upon correction of the degree of an advance, the correction is performed to achieve the rate of a change determined in accordance with the above-described equation (5) or (6) when the prerequisite for the L-FB control or non-L-FB control is not met.

As a result of a test of the present advance control on an actual engine, it has been confirmed that the engine can be controlled without any discrepancy.

By the way, the controller of this embodiment may be applied to either one intake port or both intake ports of each 4-valve or 3-valve cylinder equipped with plural intake ports. A controller of the present invention may also be applied to an normally-opened intake port (an intake port other than an intake port which is brought into an open state only at high speeds) out of plural intake ports in each cylinder of a composite air-intake engine.

It is also possible to store four maps in the memory for the combinations of a first and second air/fuel ratios and the opening and closure states of the shutter valve 10 respectively, so that a control may be performed to achieve an appropriate ignition timing $\theta$ by changing the maps suitably or by interpolation.

The present invention may also be applied to such an ignition timing controller that is equipped with a map containing sum information $(\theta_0+\theta_{S1})$ of the standard ignition timing information $\theta_0$ and the first ignition timing correction value $\theta_{S1}$ as a first ignition timing map (first ignition timing setting means) and another map containing sum information $(\theta_0+\theta_{S2})$ of the standard ignition timing information $\theta_0$ and the second ignition timing correction value $\theta_{S2}$ as a second ignition timing map (second ignition timing setting means) so as to switch by an ignition timing changeover means to the first ignition timing map when the engine is in a lean burn state as the first air/fuel ratio and to the second ignition timing map when the engine is, as the second air/fuel ratio, in an operational state other than the lean burn state.

In this case, the swirl ignition timing correction means corrects ignition timing information from either one of the first and second ignition timing maps by a desired correction value $(\pm\theta_{SS})$ on the basis of the actual state of operation of the variable swirl forming means detected by the swirl detection means.

This correction value $\theta_{SS}$ has the positive sign (i.e., $+\theta_{SS}$) when the ignition timing information $(\theta_0+\theta_{S1})$ from the first ignition timing map is selected but has the negative sign (i.e., $-\theta_{SS}$) when the ignition timing information $(\theta_0+\theta_{S2})$ from the second ignition timing map is selected.

A schematic block diagram of the overall construction in this case is substantially the same as that shown in FIG. 1 except that the first ignition timing map and second ignition timing map are substituted for the first basic advancing map 8a and second basic advancing map 8b respectively.

Having now fully described the invention, it will apparent to one of ordinary skill in the art that many changes and modifications can be made thereto without departing from the spirit or scope of the invention as set forth herein.

We claim:

1. An ignition timing controller for an engine, comprising:
   a swirl control valve arranged in an intake passage of an engine dispalceably depending on the state of operation of the engine between a first position where a strong swirling state is developed in an air stream flowing into an intake port of the engine and a second position where no swirling state is developed in the air stream;
   an operation zone detecting means for detecting the operation zone of the engine;
   a first ignition timing setting means for generating ignition timing information which is suitable when the intake air stream is in the strong swirling state in a specific operation zone;
   a second ignition timing setting means for generating ignition timing information which is suitable when the intake air stream is in a state other than the strong swirling state in an operation zone other than the specific operation zone;

an ignition timing change-over means for selectively receiving ignition timing information from the first ignition timing setting means when the engine is in the specific operation zone or ignition timing information from the second ignition timing setting means when the engine is in the operation zone other than the specific operation zone, upon receipt of a detection signal from the operation zone detecting means;

a position sensor for detecting that the swirl control valve is at the first position; and a swirl ignition timing correction means for making a logical decision on a signal from the operation zone detection means and a signal from the position sensor so as to correct the ignition timing information, which has been received from the first ignition timing setting means, with a desired correction value when the engine is in the specific operation zone and the swirl control valve is at a position other than the first position.

2. The ignition timing controller as claimed in claim 1, wherein the desired correction value is in a functional relation with the revolution number of the engine.

3. An ignition timing controller for an engine, comprising:

a swirl control valve arranged in an intake passage of an engine displaceably depending on the state of operation of the engine between a first position where a strong swirling state is developed in an air stream flowing into an intake port of the engine and a second position where no swirling state is developed in the air stream;

an operation zone detecting means for detecting the operation zone of the engine;

a first ignition timing setting means for generating ignition timing information which is suitable when the air stream is in the strong swirling state in a specific operation zone;

a second ignition timing setting means for generating ignition timing information which is suitable when the air stream is in a state other than the strong swirling state in an operation zone other than the specific operation zone;

an ignition timing change-over means for selectively receiving ignition timing information from the first ignition timing setting means when the engine is in the specific operation zone or ignition timing information from the second ignition timing setting means when the engine is in the operation zone other than the specific operation zone, upon receipt of a detection signal from the operation zone detecting means;

a position sensor for detecting an actual position of the swirl control valve; and a swirl ignition timing correction means for making a logical decision on a signal from the operation zone detection means and a signal from the position sensor so as to correct the ignition timing information, which has been selected by the ignition timing change-over means, with a desired correction value in at least one of as situation that the engine is in the specific operation zone and the swirl control valve is at a position other than the first position and another situation that the engine is in an operation zone other than the specific operation zone and the swirl control valve is at a position other than the second position.

4. The ignition timing controller as claimed in claim 3, wherein the desired correction value is in a functional relation with the revolution number of the engine.

5. The ignition timing controller as claimed in claim 3, wherein the engine is operated at a first air/fuel ratio in the specific operation zone but is operated at a second air/fuel ratio in the operation zone other than the specific operation zone.

6. The ignition timing controller as claimed in claim 5, wherein the engine is operated at the first air/fuel ratio in a lean burn zone but is operated at the second air/fuel ratio in an operation zone other than the lean burn zone.

7. The ignition timing controller as claimed in claim 3, wherein the first ignition timing setting means comprises:

a standard ignition timing setting means for determining a standard ignition timing of the engine upon receipt of a detection signal from a crank angle detection means for detecting the crank angle of the engine, and a first ignition timing correction means for setting, as a first correction value, a correction value for the standard ignition timing signal when the air stream is in the strong swirling state and the engine is in the specific operation zone;

the second ignition timing setting means comprises:

the standard ignition timing setting means common to the first ignition timing setting means, and a second ignition timing correction means for setting, as a second correction value, a correction value for the standard ignition timing signal when the air stream is in the state other than the strong swirl state and the engine is in the operation zone other than the specific operation zone;

the ignition timing change-over means is constructed as an ignition timing correction value change-over means for choosing, upon receipt of the detection signal from the operation zone detection means, the first correction value from the first ignition timing correction means when the engine is in the specific operation zone or the second correction value from the second ignition timing correction means when the engine is in the operation zone other than the specific operation zone; and the swirl ignition correction means is constructed to permit further correction of corrected ignition timing information from one of the first ignition timing correction means and second ignition timing correction means by the desired correction value on the basis of information on the actual position of the swirl control valve detected by the position sensor.

8. The ignition timing controller as claimed in claim 7, wherein the swirl ignition timing correction means is constructed to effect a correction in such a way that a correction value, which is in a functional relation with the revolution number of the engine and is the desired correction value, is added to the first correction value when the maintenance of the air stream in the state other than the strong swirl state by the swirl control valve is detected by the position sensor and the first correction value from the first ignition timing correction means has been selected by the ignition timing correction value change-over means.

9. The ignition timing controller as claimed in claim 7, wherein the swirl ignition timing correction means is constructed to effect a correction in such a way that a correction value, which is in a functional relation with the revolution number of the engine and is the desired correction value, is subtracted from the second correction value when the maintenance of the air stream in the strong swirling state by the swirl control valve is detected by the position sensor and the second correction value from the second ignition timing correction means has been selected by the ignition timing correction value change-over means.

10. The ignition timing controller as claimed in claim 7, wherein the first ignition timing correction means further comprises a memory means for storing a functional relation between information on the revolution number and load of the engine and the first correction value and is constructed to permit read-out of the first correction value corresponding to the information on the revolution number and load of the engine from the memory means by using the information on the revolution number and load of the engine as input information.

11. The ignition timing controller as claimed in claim 7, wherein the second ignition timing correction means further comprises a memory means for storing a functional relation between information on the revolution number and load of the engine and the second correction value is constructed to permit red-out of the second correction value corresponding to the information on the revolution number and load of the engine from the memory means by using the information on the revolution number and load of the engine as input information.

12. The ignition timing controller as claimed in claim 3, wherein the intake port has a composite transverse cross-sectional configuration composed of a straight portion defining an upper part of the intake port along the air stream and a swirl portion defining a lower part of the intake port along the air stream and the straight portion and swirl portion are integral with each other;

the swirl control valve is arranged in an upstream portion of the intake port displaceably between a closed position as the first position and an open position as the second position, and is equipped with a valve drive means for selectively opening or closing the swirl control valve;

the closed position of the swirl control valve is set to leave a gap between an edge portion of the swirl control valve and an inner wall of the intake passage;

the air stream is supplied to the swirl portion of the intake port through the gap when the swirl control valve is in the closed position; and the air stream is supplied to the straight portion of the intake port when the swirl control valve is in the open position.

13. The ignition timing controller as claimed in claim 12, wherein the valve drive means comprises:

a pressure responsive means for selectively opening or closing the swirl control valve; and a valve-opening delaying means interposed in an operating pressure feed line for the pressure responsive means.

14. The ignition timing controller as claimed in claim 13, wherein the valve-opening delaying means comprises an orifice and check valve provided in a relation parallel to each other in the operating pressure feed line.

15. The ignition timing controller as claimed in claim 13, wherein the valve-opening delaying means comprises:

an electromagnetic valve interposed in the operating pressure feed line for the pressure responsive means;

an engine operation state detecting means for detecting the operation state of the engine; and an electromagnetic valve control means for outputting an open/close control signal to the electromagnetic valve on the basis of detected information from the engine operation state detecting means.

16. The ignition timing controller as claimed in claim 15, wherein the electromagnetic valve control means comprises:

a valve-opening delaying zone discriminating means for discriminating whether the current operation zone of the engine is in a valve-open delaying zone or not; and a delaying-time calculating means for calculating a valve-opening delaying time period.

* * * * *